United States Patent
McMahon

(10) Patent No.: US 6,179,453 B1
(45) Date of Patent: Jan. 30, 2001

(54) SELECTIVE ZONAL COURTESY LAMPS FOR AUTOMOTIVE VEHICLE

(75) Inventor: Martha Ann McMahon, Dexter, MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/430,605

(22) Filed: Oct. 29, 1999

(51) Int. Cl.$^7$ .................................................. B60Q 3/00
(52) U.S. Cl. ............................ 362/490; 362/488; 362/489
(58) Field of Search ................................... 362/488, 489, 362/490, 543, 544, 471

(56) References Cited

U.S. PATENT DOCUMENTS

| | | | |
|---|---|---|---|
| 5,130,901 | * | 7/1992 | Priesemuth ........................... 362/488 |
| 5,149,187 | * | 9/1992 | Matsuno et al. ..................... 362/488 |
| 5,226,711 | * | 7/1993 | Matsuno et al. ..................... 362/488 |
| 5,647,657 | * | 7/1997 | Damasky et al. ..................... 362/488 |

* cited by examiner

Primary Examiner—Thomas M. Sember
(74) Attorney, Agent, or Firm—David B. Kelley

(57) ABSTRACT

An interior lighting system for an automotive vehicle has an upper group of lights mounted in the vehicle interior, a lower group of lights mounted in the vehicle interior, and a switch mounted in the vehicle interior. The switch is movable between the dome position in which both the upper and lower groups of lights are illuminated, a dim position in which both the upper and lower groups of lights are illuminated between a maximum and a minimum intensity, a floor position in which only the lower lights are illuminated, and an off position in which neither the upper nor the lower group of lights are illuminated. The lower group of lights are illuminated when the switch is in the floor position after a door-ajar condition is sensed and the vehicle is moving at a predetermined velocity. Additionally, when the switch is in the dim position, the upper and lower groups of lights are illuminated only when a door-ajar condition is sensed and the vehicle is moving at a predetermined velocity.

17 Claims, 5 Drawing Sheets

SELECTIVE ZONAL COURTESY LAMPS FOR AUTOMOTIVE VEHICLE

FIELD OF THE INVENTION

The present invention relates to interior lighting of an automotive vehicle and, more particularly to selective interior vehicle lighting.

BACKGROUND OF THE INVENTION

Occupants sleeping within a vehicle, in particular young children, may be startled when a vehicle door is opened and the overhead courtesy lamps shine into their eyes. This is particularly true when it is dark outside and the occupant is sleeping. Prior technologies allowed a driver to disable all courtesy lamps in a vehicle interior with an instrument panel mounted switch, or to disable a single courtesy lamp with a lamp mounted switch. When all courtesy lamps are disabled, the interior of the vehicle is dark when the door is opened making it difficult for a person to collect belongings, to see clearly to exit, and to remove the sleeping occupant from the vehicle, for example, from a car seat. Further, disabling a courtesy lamp using a lamp mounted switch is difficult for the driver if the lamp is in the second or third row of the vehicle. Additionally, the cost of adding such switches to all overhead courtesy lamps is prohibitive on vehicles with multiple overhead lamps.

SUMMARY OF THE INVENTION

The present invention overcomes the aforementioned disadvantages by providing a lighting mode selection feature which allows the driver to disable all overhead courtesy lamps from a single instrument panel mounted switch so that when a door is opened, only the courtesy lamps under the instrument panel and/or on the doors or stepwells, are illuminated. This invention allows the driver to see clearly to collect belongings, exit, and remove occupants from the vehicle while preventing the occupant from being startled from the glare of overhead courtesy lamps.

The invention includes a selective zonal lighting system for an interior of an automotive vehicle having an upper group of lights mounted in the vehicle interior, a lower group of lights mounted in the vehicle interior, and a switch mounted in the vehicle interior. The switch is movable between a first position in which both the upper and lower groups of lights are illuminated, a second position in which only the lower group of lights are illuminated, and a third position in which neither the upper nor the lower group of lights is illuminated. The switch may have a fourth, variable position in which both the upper and lower groups are illuminated between a maximum intensity and a minimum intensity. Preferably, the lower group of lights are illuminated when the switch is in the second position only after a door ajar condition is sensed and the vehicle is moving below a predetermined velocity. Additionally, when the switch is in the fourth position, the upper and lower groups of lights are illuminated only when a door ajar condition is sensed and the vehicle is moving below a predetermined velocity.

An advantage of the present invention is that vehicle occupants may collect belongings and see clearly to exit the vehicle without disturbing other passengers, such as a sleeping child.

Another advantage of the present invention is that a vehicle driver may select illumination of only a lower group of lights from the driver seat without the necessity of individually disabling each courtesy lamp in an upper group of lights.

Yet another advantage of the present invention is that use of a single, selective zonal switch eliminates the cost of placing a switch on each overhead courtesy lamp in order to disable it.

DETAILED DESCRIPTION OF THE PREFERRED EMBODIMENT

Figure 1:
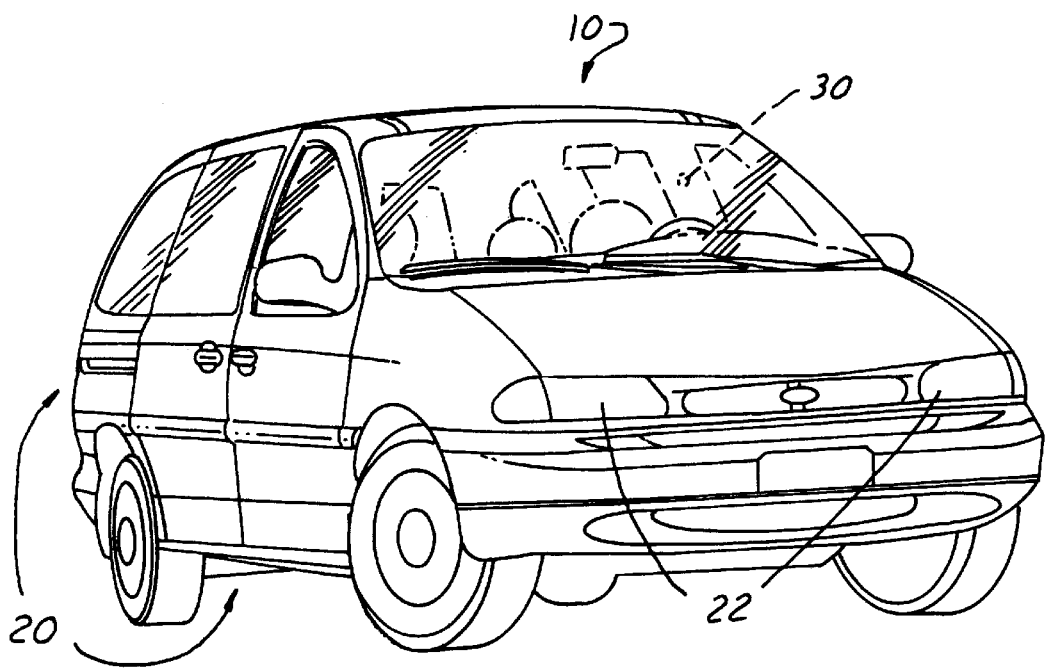
FIG. 1 is a perspective view of an automotive vehicle utilizing the selective interior zonal lighting system of the present invention.

Referring now to the drawings, and in particular to FIG. 1 thereof, an automotive vehicle generally indicated at 10, having an exterior generally indicated at 20, and an interior generally indicated at 30. The exterior 20 has exterior lighting associated therewith, for example, headlamps 22 which provide a vehicle driver the ability to see the road during dark or inclement conditions. As is conventional, interior lighting is also provided to permit vehicle occupants the ability to see within the interior 30 of the vehicle.

Figure 2:
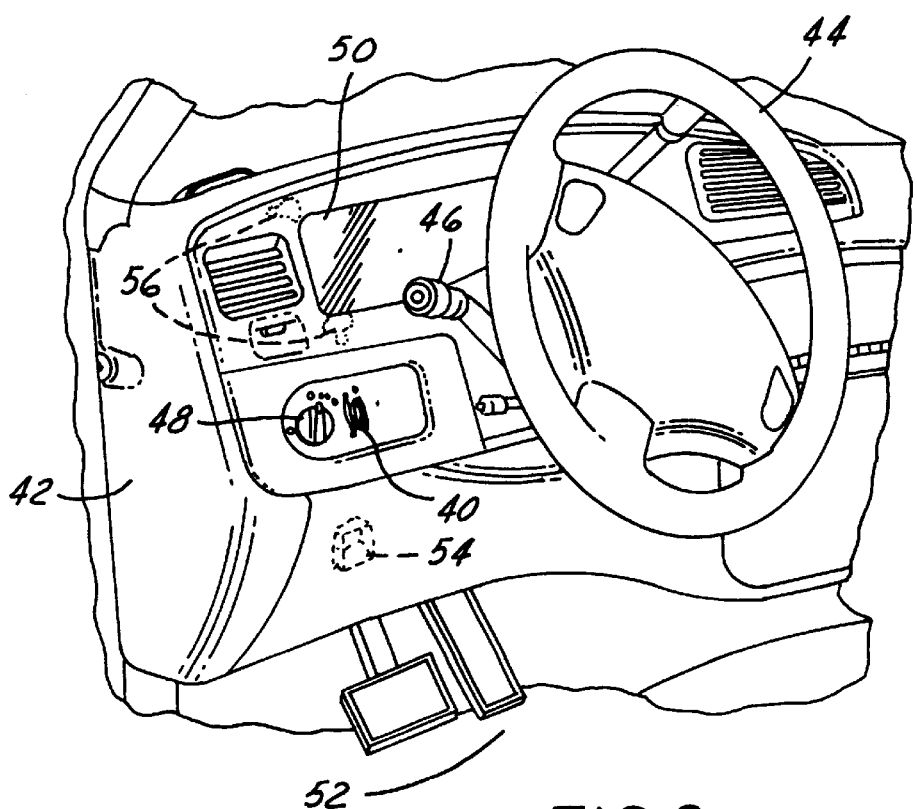
FIG. 2 is a perspective view of a driver's side instrument panel having an interior selective zonal lighting switch for use with the present invention.

Referring now to FIG. 2, a driver's side instrument panel is shown having an interior selective zonal lighting switch 40, or courtesy lamp mode switch, for use with the present invention. The switch 40 is preferably located within reach of a driver, preferably on an instrument panel 40 at a location near other vehicle controls, for example, a steering wheel 44, a blinker lever 46, or an exterior light switch 48. As is further described below, the switch 40 has various positions to select various lighting modes and lighting zones within the interior of the vehicle 10.

Various lights may be operated by the switch 40 including instrument panel courtesy lamps, for example, lamps which illuminate gauges and other vehicle information provided in an instrument cluster 50 on the instrument panel 42 (FIG. 2), as well as courtesy lamps which illuminate an area beneath the instrument panel in the general vicinity indicated at 52, of a front seat occupant's feet. Such lamps, indicated at 54, are typically located out of view of the vehicle occupants, as are the instrument cluster lamps, generally indicated at 56 (FIG. 2). Those skilled in the art will understand that the placement of the lamps 54, 56 are for illustration purposes only, and that the present invention is not limited to the locations identified in FIG. 2, nor to the shapes shown therein.

Figure 3:
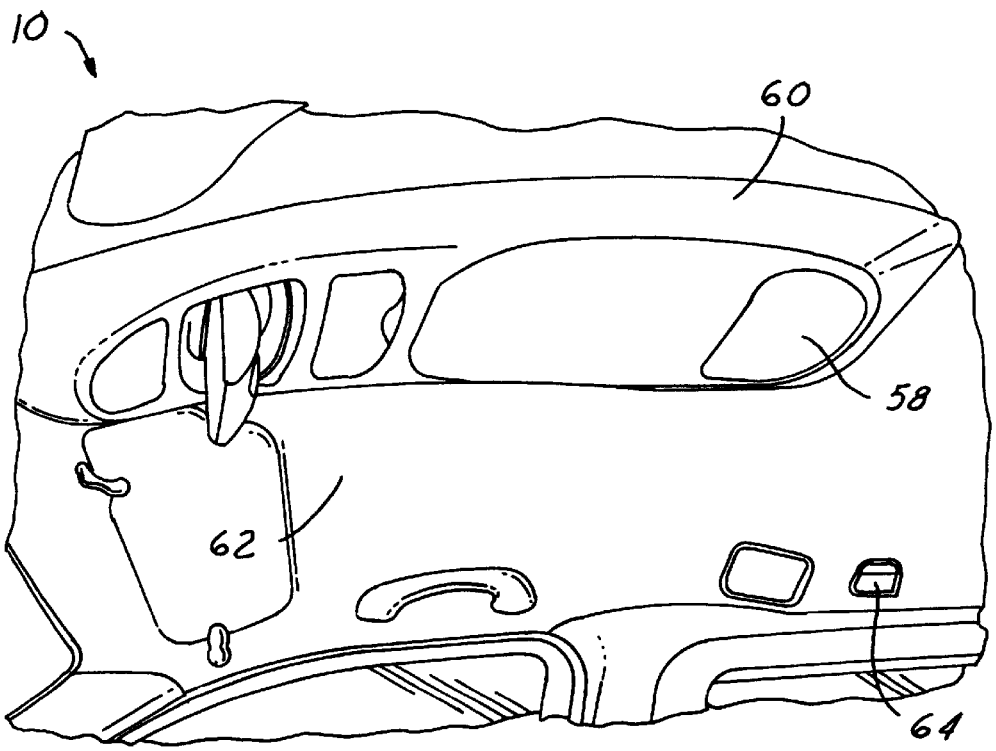
FIG. 3 is a perspective view of a roof interior showing a dome lamp and a rear reading lamp in an upper group of lights operated by the selective, zonal lighting system of the present invention.
Figure 4:
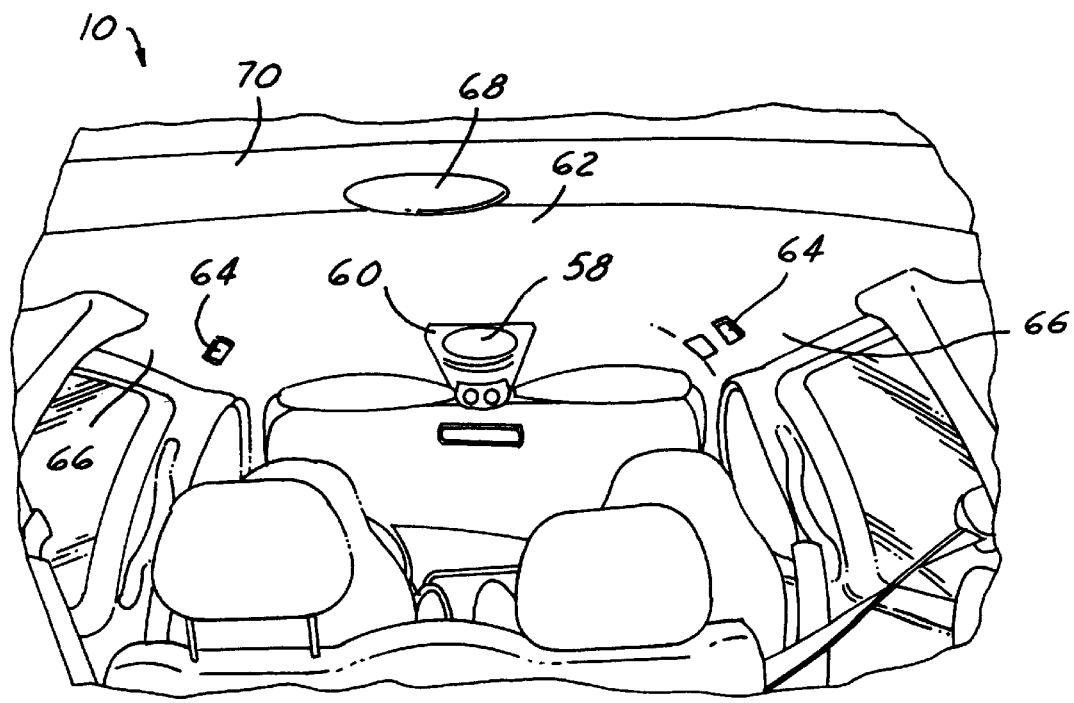
FIG. 4 is a perspective interior rear view through a rear opening of the vehicle showing a rear cargo lamp and rear reading lamps as part of an upper group of lights operated by the selective, zonal lighting system of the present invention.

Vehicle 10 has a dome lamp 58 in a roof mounted console 60 attached near a centerline of the roof 62 (FIGS. 3 and 4). Vehicle 10 also includes rear reading lamps 64 on opposed lateral lower sides 66 of the roof 62. The rear reading lamps may be located along the vehicle roof rail, as is known in the art. Additionally, a cargo lamp 68 is mounted in an upper trim piece 70 at a rear end of the roof 62 adjacent the rear opening of the vehicle (FIG. 4). The lights 58, 64, 68 collectively comprise an upper group of lights which, as further described below, are selectively illuminated by the zonal lighting system of the present invention. It should be understood that, for purposes of this invention, a light is included within the upper group of lights if it is located above the instrument panel. In addition, those skilled in the art will understand that lights other than those shown in FIGS. 3 and 4 may be included in the upper group of lights and that the invention is not limited tc those lights shown in FIGS. 3 and 4. Further, an upper group of lights need not contain the lights shown in FIGS. 3 and 4, or may include such lights at different locations throughout the interior of vehicle 10. For example, the dome lamp 58 may be located on the roof 62 off of the console 60, the rear reading lamps may be located on the B-pillar or C-pillar, or the cargo lamp may be located on a more forward portion of the roof 62 near the rear vehicle access opening. These examples are meant to be illustrative and not limiting.

Figure 5:
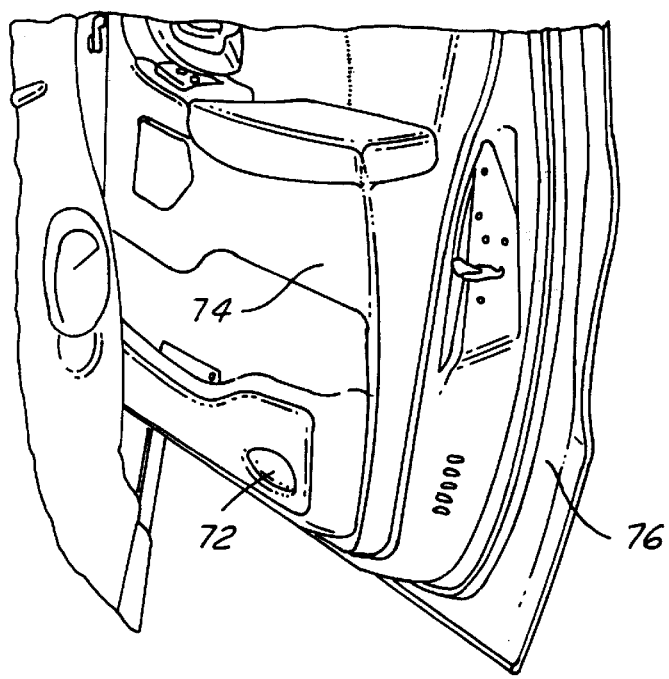
FIG. 5 is a perspective view of a vehicle door having an interior courtesy lamp as part of a lower group of lights operated by the selective, zonal lighting system of the present invention.

Vehicle 10 also has a lower group of lights which includes a front door courtesy lamp 72 located on an inner trim panel 74 of a door 76 (FIG. 5). The courtesy lamp 72 may light up a lower portion of the interior of the vehicle when the door is in a closed position and may illuminate the area near a door opening (not shown) when in an opened position when it is dark. The lower group of lights may also include a stepwell lamp 78 on a rear facing surface 80 of a B-pillar 82 at. a lower portion thereof adjacent a step 84. Those skilled in the art will realize such stepwell lamps may be located on both sides of a vehicle, for example, in a van-type vehicle with sliding doors on both sides thereof. In addition, there may be other lamps located along lower portions of the B-pillar, C-pillar, and/or D-pillar for illumination of a lower area of the vehicle, for example, along the floor of the vehicle.

Figure 6:
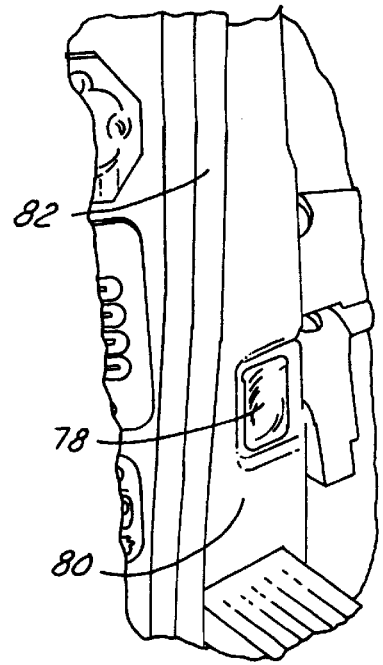
FIG. 6 is a perspective view of a vehicle B pillar having a lamp in the vicinity of a stepwell as part of a lower group of lights operated by the selective, zonal lighting system of the present invention.
Figure 7A:
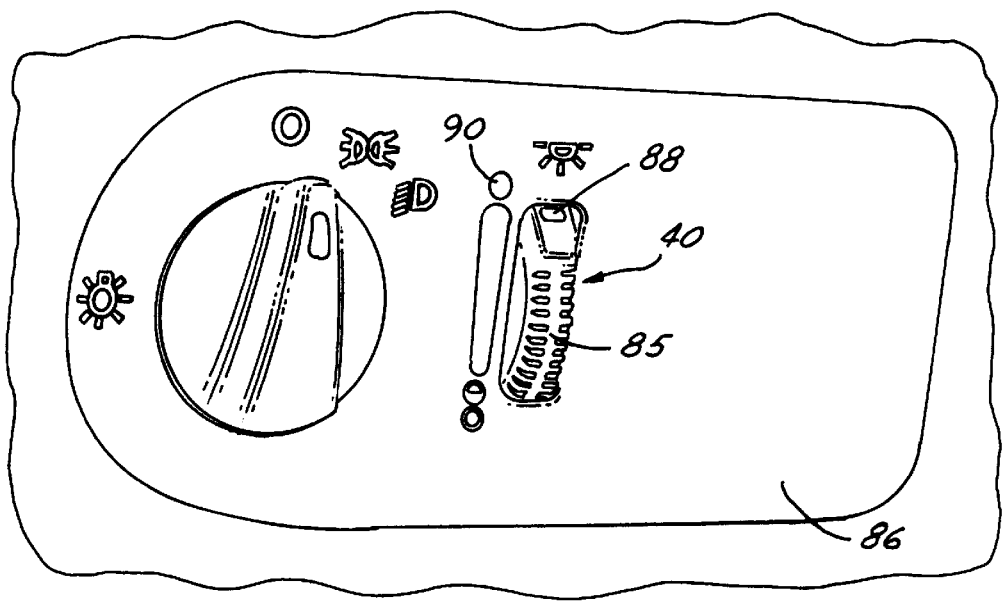
FIGS. 7A–7D are perspective views of a zonal selective switch according to the present invention shown in a first position in which both upper and lower groups of lights are illuminated, a fourth position in which both upper and lower groups of lights are illuminated between a maximum intensity and a minimum intensity, a second position in which only the lower group of lights are illuminated, and a third position in which neither the upper nor the lower groups of lights is illuminated.
Figure 7B:
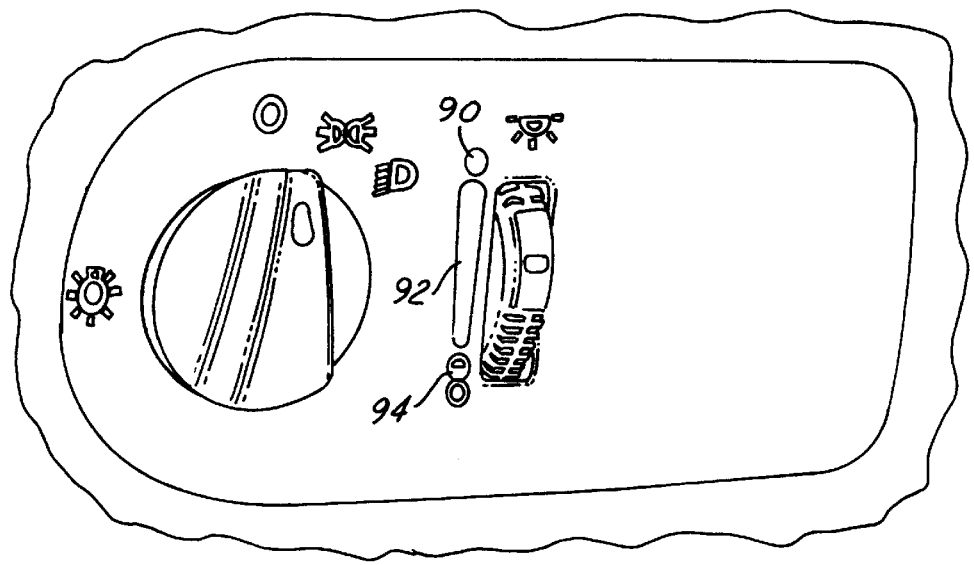
Figure 7C:
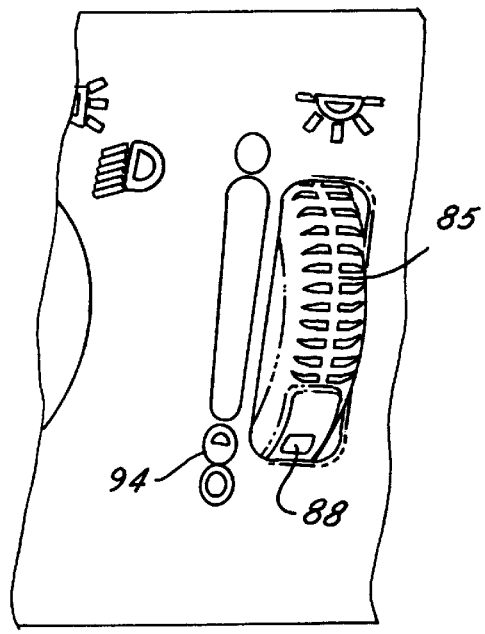
Figure 7D:
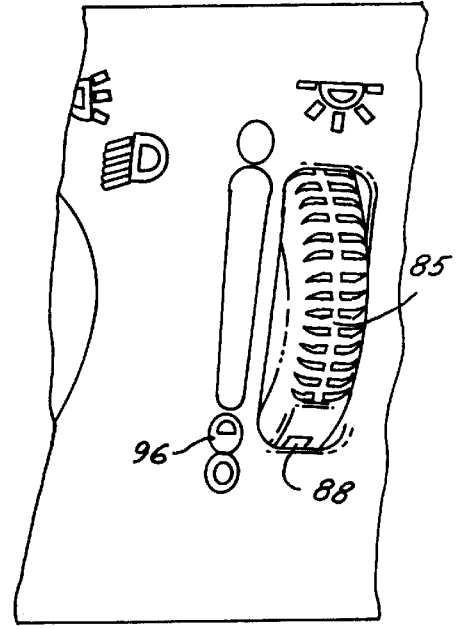

The lower group of lights, sometimes referred to as "footlights", also includes the instrument panel courtesy lamps described above. It should be understood that the lower group of lights, for purposes of this disclosure, includes those lights and/or lamps at or below the level of the instrument panel. Those skilled in the art will understand that lights other than those shown in FIGS. 2, 5 and 6 may be included in the lower group of lights. In addition, the lights shown in FIGS. 2, 5 and 6 may be placed at different locations throughout the vehicle interior. Further, it should be understood that the lights shown in FIGS. 2, 5 and 6 need not be included in the lower group of lights, the only requirement being that at least one light be included in the lower group of lights.

The selective, zonal lighting system of the present invention is operated through switch 40, which has four positions, as shown in FIGS. 7A–D. In a preferred embodiment, the switch 40 is a thumb dial rotatable between three detent positions and a variable lighting position, as further described below. Next to switch 40 on the lighting panel 86 is a graphic, which indicates switch position when aligned with an indicator 88 on the thumb dial 85. When the indicator 88 is aligned with an upper graphic 90, the switch 40 is in a. first position (FIG. 7A) in which both the upper and lower group of lights are illuminated. This top detent position for switch 40 is sometimes referred to as the "dome" position. All interior lamps are activated in this position regardless of other vehicle conditions, for example, regardless of door position or vehicle speed.

When the thumb dial 85 is rotated so that the indicator 88 aligns with the variable lighting graphic 92 (FIG. 7B), both the upper and lower groups of lights are illuminated between a maximum intensity and a minimum intensity when certain vehicle conditions are encountered. Preferably, these vehicle conditions include a door position and a vehicle speed. In a preferred embodiment, both the upper and lower groups of lights will illuminate when a door is ajar, and when the vehicle speed is less than 10 mph. If the vehicle speed exceeds 15 mph while any door is ajar, all interior lamps will extinguish. It should be understood that the present invention is not limited to the just-described vehicle conditions for operation of the interior lamps when in the variable position, sometimes called the "dim" position shown in FIG. 7B but may include other vehicle conditions or not include the herein described vehicle conditions. It should be understood that the upper and lower groups of lights will vary in intensity and brightness as the thumb dial is rotated between the dome detent, indicated at graphic 90, and the floor or foot detent, indicated at 94.

When the thumb dial 85 is rotated so that indicator 88 is aligned with graphic 94 (FIG. 7C), only the lower group of lights are illuminated when certain vehicle conditions are encountered as described above. In particular, the lower group of lights will illuminate when the courtesy lamp mode switch 40 is in the "foot", or "floor", position (FIG. 7C) and any door is ajar while the vehicle speed is less than 10 mph. If the vehicle speed exceeds 15 mph while any door is ajar, the interior lamps will extinguish.

When the thumb dial 85 is rotated such that it reaches a third detent when the indicator 88 is aligned with an off graphic 96 (FIG. 7D), sometimes referred to as the "off" position, no interior lamps will illuminate regardless of any door position or vehicle speed.

Figure 8:
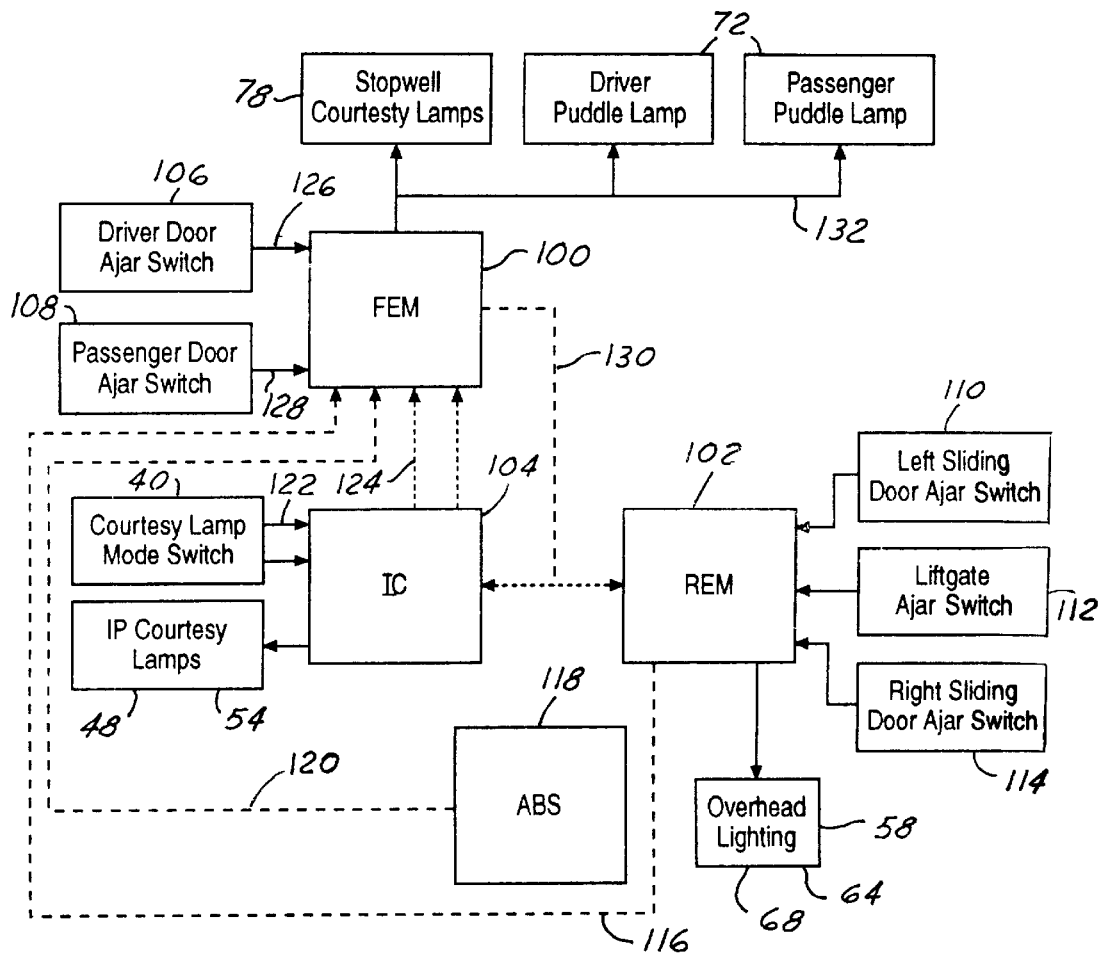
FIG. 8 is an electrical schematic diagram showing operation of the selective zonal switch used in the present invention.

Turning now to FIG. 8, a schematic diagram of the electronic components of a selective interior zonal lighting system of the present invention is shown. The lighting system may include a front electronics module 100, a rear electronics module 102, and an instrument cluster module 104. The front electronics module (FEM) 100 receives sensor inputs from both a driver door-ajar switch 106 and a passenger door-ajar switch 108, which can be conventional ajar switches known in the art. The rear electronics module (REM) 102 receives signals from a left sliding door-ajar switch 110, a liftgate-ajar switch 112, and a right sliding door-ajar switch 14. The REM 102 has appropriate electronics for combining these signals and sending a rear door-ajar signal 116 to the FEM 100. The vehicle speed may be taken from the antilock brake system (ABS) 118, for both the driven and undriven wheels. Alternatively, for vehicles not equipped with ABS, vehicle speed may be taken from another speed sensing location known to those skilled in the art. In any event, a vehicle speed signal 120 is sent to the FEM 100.

The instrument cluster 104 receives a signal 122 representative of the courtesy lamp mode switch position. This switch position is then passed by the instrument cluster 104 to the FEM 100 as a signal 124.

Logic within the FEM 100 takes the courtesy lamp mode switch position 124, along with the rear door-ajar composite signal 116, a driver door-ajar signal 126, and a passenger door-ajar signal 128, and the vehicle speed signal 120, and determines which, if any, interior lamps should be illuminated. If the courtesy lamp mode switch 40 is in the dome position, the FEM 100 sends a signal 130 to both the REM 102 and the instrument cluster 104 to illuminate the upper group of lights 64 and 68, and the instrument panel courtesy lights 48 and 54, respectively. In addition, the FEM 100 sends a signal 132 directly to the stepwell courtesy lamps 78 and the driver and passenger puddle lamps 72 (FIG. 8).

When the courtesy lamp mode switch 40 is in the dim position, and a door-ajar signal is received, either signal 126, 128 or 116, and the vehicle speed signal 120 is less than 10 mph, the FEM 100 sends a signal 130 to both the REM 102 and the instrument cluster 104 to illuminate the overhead lighting in the instrument panel courtesy lamps to the desired intensity as indicated on the thumb dial. In addition, the stepwell courtesy lamps and the driver and passenger puddle lamps are illuminated to the desired intensity via a direct signal 132 from the FEM 100. If the courtesy mode switch 40 is in the floor position, the FEM 100 sends a signal 130 only to the instrument cluster 104 to illuminate the instrument panel courtesy lamps 48, 54 and in addition sends a signal 132 to the stepwell courtesy lamps and the driver and passenger puddle lamps 72. However, no signal is sent to the REM 102 for overhead lighting illumination. These four groups of lights are illuminated only if a door-ajar signal 126, 128 or 116 is received at the FEM 100, in addition to a vehicle speed 120 of less than 10 mph.

Finally, if the courtesy mode switch is in the off position, the FEM 100 does not send any signals to the REM 102, the instrument cluster 104, the stepwell courtesy lamps 78 or the driver or passenger puddle lamps.

It should be understood that the invention described herein is not limited to the exact construction and/or method which has been illustrated or described above, but that various changes may be made without departing from the spirit and scope of the invention.

What is claimed is:

1. A selective zonal lighting system for an interior of an automotive vehicle comprising:
    an upper group of lights mounted in the vehicle interior;
    a lower group of lights mounted in the vehicle interior; and
    a switch mounted in the vehicle interior movable between a first position in which both the upper and lower group of lights are illuminated, a second position in which only the lower group of lights are illuminated, and a third position in which neither the upper nor the lower group of lights are illuminated.

2. The lighting system of claim 1 and further including a fourth position for the switch in which both the upper and lower groups of lights are illuminated between a maximum intensity and a minimum intensity.

3. The lighting system of claim 2 wherein illumination of the lower group of lights when the switch is in the second position and illumination of both groups of lights when the switch is in the fourth position is dependent on a predetermined vehicle condition.

4. The lighting system of claim 3, wherein the predetermined vehicle condition includes both a door position and a vehicle speed.

5. The lighting system of claim 4, wherein the door position is a door ajar condition and the vehicle speed is less than ten miles per hour.

6. The lighting system of claim 1, wherein the upper group of lights includes at least one of a reading lamp, a map lamp, a dome lamp, and a rear cargo lamp.

7. The lighting system of claim 1, wherein the lower group of lights includes at least one of a door puddle lamp, a door step well lamp, and an instrument panel lamp.

8. The lighting system according to claim 1, wherein the lower group of lights includes all interior vehicle lights below a vertical height of a vehicle instrument panel, and the upper group of lights includes all interior vehicle lights above the vehicle instrument panel.

9. The lighting system according to claim 1, wherein the switch is located on a vehicle instrument panel within reach of a driver.

10. The lighting system according to claim 1, wherein the at least one upper light includes at least one of a reading lamp, a map lamp, a dome lamp, and a rear cargo lamp.

11. The lighting system according to claim 1, wherein the at least one lower light includes one of a door puddle lamp, a door step well lamp, and an instrument panel lamp.

12. The lighting system of claim 1, wherein the switch is located on a vehicle instrument panel.

13. A light system for an interior of an automotive vehicle comprising:
    an upper lighting zone having at least one upper light in the interior;
    a lower lighting zone having at least one lower light mounted for illuminating the interior;
    a switch mechanism for selectively operating the at least upper light and the at least one lower light, the switch mechanism movable between:
        a dome position in which the lights in both zones are illuminated to a maximum intensity;
        a dim variable position in which the lights in both zones are illuminated between a maximum intensity and a minimum intensity;
        a floor position in which the at least one lower light is illuminated; and
        an off position in which none of the interior lights are illuminated.

14. The lighting system of claim 13, wherein illumination of the at least one lower light, when the switch is in the floor position, and illumination of both groups of lights when the switch is in the dim position, is dependent upon a predetermined vehicle condition.

15. The lighting system of claim 14, wherein the predetermined vehicle condition includes a door position and a vehicle speed.

16. The lighting system according to claim 15, wherein the door position is a door ajar position and the vehicle speed is less than 10 mph.

17. A lighting system for an interior of an automotive vehicle, comprising:
    a plurality of lights mounted in the interior of the vehicle within an upper zone and a lower zone for lighting said interior; and
    a switch for selectively operating the plurality of lights movable between a dome position in which lights in both the upper and lower zones are illuminated, a dim variable position in which lights in both zones are illuminated between a maximum intensity and a minimum intensity when a door ajar condition is sensed and the vehicle is moving less than 10 mph, a fool position in which lights in only the lower zone are illuminated when a door ajar condition is sensed and when the vehicle is traveling less than 10 mph, and an off position in which none of the interior lights are illuminated.

* * * * *